Figure 1:
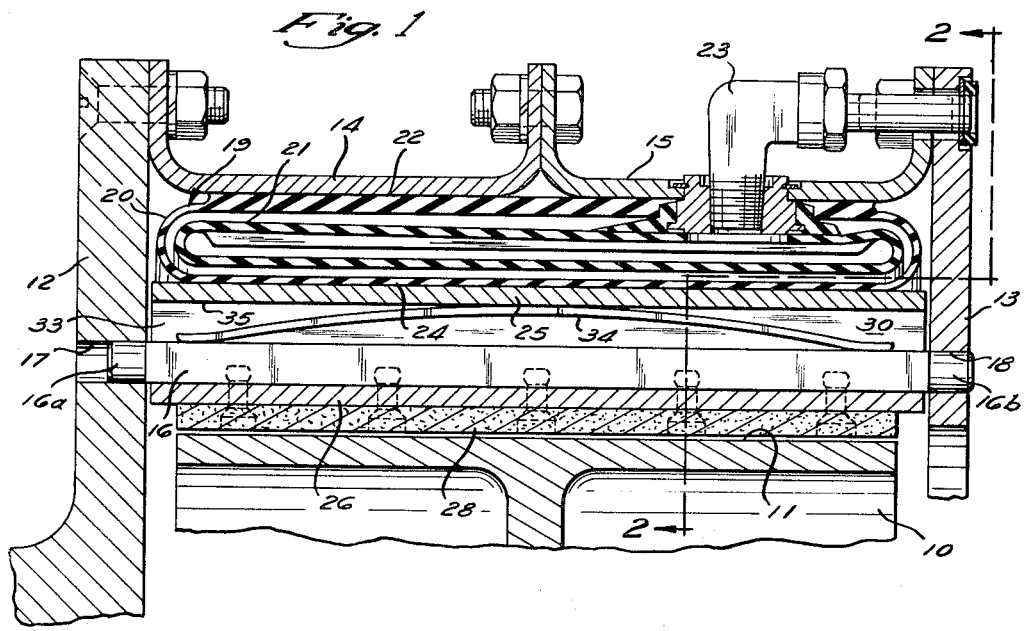

March 16, 1965  J. V. EAKIN  3,173,527

FLUID-ACTUATED COUPLING AND WEAR SHOE THEREIN

Filed Jan. 14, 1963

INVENTOR.
JOHN V. EAKIN
BY
William J. Flynn
ATTORNEY

United States Patent Office 3,173,527
Patented Mar. 16, 1965

3,173,527
FLUID-ACTUATED COUPLING AND WEAR SHOE THEREIN
John V. Eakin, Rocky River, Ohio, assignor to Fawick Corporation, a corporation of Michigan
Filed Jan. 14, 1963, Ser. No. 251,119
8 Claims. (Cl. 192—88)

This invention relates to a fluid-actuated coupling suitable for use as a clutch or brake and to a wear shoe for use therein.

In United States Letters Patent No. 2,870,891 to John V. Eakin et al., there is disclosed and claimed a constricting clutch or brake having relatively rotatable outer and inner structures. The inner structure is a friction drum. The outer structure comprises axially spaced end plates, torque-sustaining bars extending between them, a plurality of wear shoes in confronting relationship to the friction drum and coupled individually to the torque-sustaining bars, and a fluid-distensible torque bag or diaphragm surrounding the wear shoes and inflatable to force the wear shoes radially inward into frictional engagement with the drum. Such clutch or brake arrangements have been found to be comparatively rigid; that is, there is only a slight deflection of the outer structure circumferentially with respect to the drum each time the clutch or brake is applied and carries the load.

The present invention is directed to a novel fluid-actuated coupling suitable for use as a clutch or brake, preferably of the same general type, which has a greater circumferential deflection of one of the relatively rotatable structures with respect to the other each time the clutch or brake is applied and carries the load. Clutches having this characteristic are advantageous for certain practical applications, such as in drive arrangements in which one of the clutch structures is to be "stepped" or "walked" circumferentially with respect to the other clutch structure.

Accordingly, it is the principal object of this invention to provide a novel and improved fluid-actuated coupling suitable for use as a clutch or brake having an increased deflection when carrying the clutching or braking load.

Another object of this invention is to provide such a coupling having enhanced resiliency which permits such increased deflection.

Another object of this invention is to provide such a coupling in which the torque-sustaining characteristics are not impaired by its enhanced resiliency.

Also, it is an object of this invention to provide a novel and improved wear shoe for such a coupling.

Further objects and advantages of this invention will be apparent from the following detailed description of a presently-preferred embodiment thereof, which is illustrated in the accompanying drawing.

Figure 2:
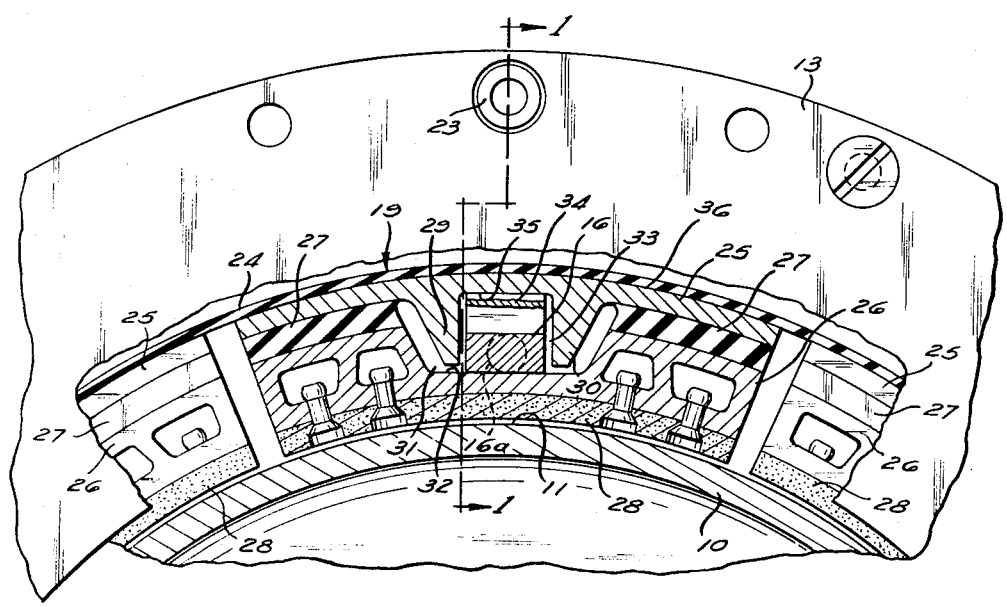

In the drawing:

FIGURE 1 is a fragmentary axial section, taken along the line 1—1 in FIGURE 2, of a coupling embodying the present invention; and FIGURE 2 is a fragmentary radial section of this coupling, taken along the line 2—2 in FIGURE 1.

Referring first to FIG. 1, the present coupling assembly is essentially similar in most respects to the assembly disclosed in the aforementioned United States Letters Patent No. 2,870,891. It comprises two relatively rotatable, coaxially disposed structures adapted for torque-sustaining frictional engagement with one another and arranged one inside the other.

The inner structure is a rotatable rigid drum 10 presenting a radially outwardly facing, cylindrical, frictional-engagement face 11. The drum 10 is secured to a rotatable shaft (not shown).

The outer structure includes a pair of rigid, axially spaced, radially disposed end plates 12 and 13, which are positioned axially beyond the opposite ends of the drum 10. These plates are rigidly connected to one another by a pair of rigid rings 14 and 15, bolted to one another and each bolted to one of the end plates. Each of these connecting rings is U-shaped in cross-section, as shown in FIG. 1. The end plate 12 is secured to another rotatable shaft (not shown).

A plurality of torque-transmitting bars 16 extend between the end plates 12 and 13 in torque-sustaining relationship with both. These torque-transmitting bars 16 are disposed at equal radial distances from the conjoint axis of rotation of the outer and inner structures and are spaced apart at equal intervals arcuately of the assembly. Each torque transmitting bar 16 throughout its extent between the end plates 12 and 13 is of oblong rectangular cross-section, as shown clearly in FIGURE 2. Each torque transmitting bar presents reduced opposite ends 16a and 16b of circular cross-section which are snugly received in corresponding holes 17 and 18 in the end plates 12 and 13, respectively. In this manner, the torque bars 16 are rigidly supported by both end plates.

The connecting rings 14 and 15 rigidly support a hollow, fluid-distensible, resilient, annular diaphragm or torque bag 19. This diaphragm or torque bag preferably comprises an outer hollow annulus 20 and an inner tube 21. Both of these members of the diaphragm are made of cord-reinforced, vulcanized, soft rubber or other rubber-like material having suitable characteristics of deformability and resiliency. The outer diaphragm annulus 20 is vulcanized at its annular outside circumferential wall 22 to the inside of the spacer rings 14 and 15. A fluid inlet-outlet fitting 23 communicates with the interior of the inner tube 21 in the diaphragm. When fluid, preferably air, under pressure is introduced through this fitting into the inner tube, the diaphragm is distended radially inward. The outer annulus 20 of the diaphragm presents an annular inside circumferential wall 24 which moves radially inward when the diaphragm is distended by fluid under pressure.

A plurailty of arcuate wear shoes are disposed radially between the inside circumferential wall 24 of the diaphragm and the outwardly-facing frictional-engagement face 11 on the drum. These wear shoes are disposed in succession circumferentially around the drum.

In accordance with the present invention, each wear shoe comprises a substantially rigid outer backing plate 25, a substantially rigid inner plate 26, and deformable and resilient material 27, preferably, soft rubber, sandwiched between them and bonded to both. A facing 28 of friction material is riveted to the arcuate, radially inside face of the inner plate 26. This friction facing is positioned in confronting relation to the frictional-engagement face 11 of the drum 10.

As best seen in FIG. 2, the outer plate 25 of each wear shoe is formed with inwardly extending projections 29 and 30. These projections 29 and 30 both extend the entire axial length of the outer plate and they are spaced apart circumferentially on opposite sides of the axial centerline of this plate.

The inner plate 26 of each wear shoe is formed with a recess 31 which receives these projections 29 and 30. The bottom 32 of this recess and these projections together define a rectangular opening 33 which receives the respective rectangular torque-sustaining bar 16. As shown in FIG. 2, there is a slight clearance between each side edge of this torque-sustaining bar and the adjacent projection 29 and 30.

A bowed or arched leaf spring 34 is engaged under compression between the radially outward flat face on the torque-sustaining bar 16 and the radially inside surface 35 of the outer wear shoe plate 25 between the projections 29 and 30. Normally, this spring biases the entire wear shoe assembly radially outwardly, so that the friction facing 28 is spaced from the frictional-engagement face 11 on the drum and the radially outward arcuate face 36 on the outer plate 25 of the wear shoe is close to, or touching, the inside circumferential wall 24 of the fluid-distensible diaphragm 19.

The entire wear shoe assembly is separate from the diaphragm 19; it is not attached to or mounted upon the diaphragm.

As shown in FIGURE 2, the rubber spacer material 27, which has an appreciable radial thickness, is sandwiched between the outer plate 25 and the inner plate 26 of each wear shoe on opposite sides of the recess 31 therein. Preferably, this rubber material 27 is secured by vulcanized adhesion to both the outer and inner plates of the wear shoe.

Due to the presence of this rubber material 27 in each wear shoe, the clutch or brake is capable of substantial resilient deflection each time the clutch is applied.

Assume that the assembly is operated as a clutch and that before the clutch is applied the outer structure is rotating clockwise in FIG. 2 and the inner structure (drum 10) is stationary. Under these conditions, the leading edge of each torque-sustaining bar 16 will engage the inside face of the respective projection 30 (which is at the clockwise side of the torque-sustaining bar), so that the wear shoes will rotate in unison with the end plates 12, 13 and the diaphragm 19 carried by the end plates.

When fluid under pressure is introduced into the diaphragm 19, the wear shoes will be forced radially inward to bring the respective friction facings 28 into frictional, torque sustaining engagement with the outer frictional-engagement face 11 of the drum 10. The drum, being stationary at first, exerts a circumferential drag on the wear shoes. While the outer plate 25 of the wear shoe continues to advance with the respective torque-sustaining bar 16, the inner plate 26 of the wear shoe is retarded to the extent permitted by the resilient circumferential deformation of the rubber pads 27 which couple the inner plate to the outer plate. By appropriate design, the resilient deformation which takes place will permit a suitable deflection of the outer clutch structure circumferentially with respect to the inner clutch strucure, such as .025 inch, each ime the clutch is applied.

From the foregoing description, it will be evident that the particular illustrated arrangement is well adapted for the accomplishment of the stated objectives of this invention. However, while a presently-preferred embodiment of the invention has been shown and described, it is to be understood that various modifications, omissions and refinements which depart from the disclosed embodiment may be adopted without departing from the spirit and scope of this invention.

I claim:

1. A fluid-actuated coupling comprising two relatively rotatable structures adapted for torque-sustaining frictional engagement with one another, one of said structures having an actuating wall which is movable in one direction to bring said structures into torque-sustaining engagement, the other of said structures having a frictional-engagement face spaced in said one direction from said actuating wall, said one structure also including a plurality of wear shoes disposed between said actuating wall and said frictional-engagement face on said other structure at successive locations circumferentially around said actuating wall, each said wear shoe comprising a substantially rigid backing plate adjacent said actuating wall, a substantially rigid second plate spaced in said one direction from said backing plate and disposed closely adjacent said fricitonal engagement face on said other structure, a friction facing on said second plate for engagement with said frictional engagement face on said other structure, and rubber-like material sandwiched between said backing plate and said second plate and bonded to both, said rubber-like material having an appreciable thickness in said one direction enabling it to undergo substantial deformation circumferentially when stressed, said backing plate and said second plate throughout their respective extents having a substantial circumferential clearance from one another to enable substantial circumferential displacement of said second plate with respect to said backing plate along with circumferential deformation of said rubber-like material when said relatively rotatable structures are brought into torque-sustaining engagement.

2. A fluid-actuated coupling comprising two relatively rotatable structures adapted for torque-sustaining frictional engagement with one another, one of said structures comprising a hollow, fluid-distensible, resilient, annular diaphragm having an annular circumferential wall which is movable radially by internal fluid pressure in the diaphragm, the other of said structures having a radially facing frictional-engagement face spaced radially from said circumferential diaphragm wall, said one structure also including a plurality of arcuate wear shoes disposed between said circumferential diaphragm wall and said frictional-engagement face on said other structure at successive locations circumferentially around said circumferential diaphragm wall, each said wear shoe comprising an arcuate, substantially rigid backing place adjacent said circumferential diaphragm wall, an arcuate, substantially rigid second plate spaced radially from said backing plate and disposed closely adjacent said frictional engagement face on said other structure, a friction facing on said second plate for engagement with said frictional-engagement face on said other structure, and rubber-like material sandwiched between said backing plate and said second plate and bonded to both, said rubber-like material having an appreciable radial thickness between said backing plate and said second plate enabling it to undergo substantial circumferential deformation when stressed, said backing plate and said second plate throughout their respective extents having a substantial circumferential clearance from one another which permits substantial displacement of said second plate circumferentially with respect to said backing plate along with circumferential deformation of said rubber-like material when said relatively rotatable structures are brought into torque-sustaining engagement.

3. A fluid-actuated coupling comprising two relatively rotatable structures adapted for torque-sustaining frictional engagement with one another, one of said structures comprising a hollow, fluid-distensible resilient, annular diaphragm having an annular inside circumferential wall which is movable radially inward by internal fluid pressure in the diaphragm, the other of said structures having a radially outwardly facing frictional-engagement face disposed radially inward from said inside circumferential diaphragm wall, said one structure also including a plurality of arcuate wear shoes disposed between said inside circumferential diaphragm wall and said frictional-engagement face on said other structure at successive locations circumferentially around said inside circumferential diaphragm wall, each said wear shoe comprising an arcuate, substantially rigid outer plate adjacent said inside circumferential diaphragm wall, an arcuate substantially rigid inner plate disposed radially inward from said outer plate and closely adjacent said frictional engagement face on said other structure, a facing of friction material on the inside face of said inner plate, and rubber-like material sandwiched between said outer and inner plates and bonded to both, said rubber-like material having an appreciable radial thickness between said outer and inner plates enabling it to undergo substantial deformation circumferentially when stressed, said outer and inner plates throughout their respective extents having a substantial circumferential clearance from one another which permits substantial displacement of the inner plate circumferentially with respect to the outer plate along with circumferential deformation of said rubber-like material when said relatively rotatable structures are brought into torque-sustaining engagement.

4. In a fluid-actuated coupling having two relatively rotatable structures one within the other and adapted for torque-sustaining frictional engagement with each other, the inner one of said structures having a radially outwardly facing frictional-engagement face, and the outer of said structures comprising a pair of axially spaced end members, a plurality of spaced torque-sustaining bars, each extending between said end members and in torque-sustaining relationship with both, a hollow, fluid-distensible, resilient, annular diaphragm rigidly supported by said end members radially outward from said torque-sustaining bars and having an annular inside circumferential wall which is movable radially inward by internal fluid pressure in the diaphragm, and a plurality of arcuate wear shoes disposed in succession circumferentially along said inside circumferential diaphragm wall between said inside circumferential diaphragm wall between said inside circumferential diaphragm wall and said frictional-engagement face on the inner structure, the improvement which comprises: each said wear shoe comprising a rigid arcuate outer plate positioned adjacent said inside circumferential diaphragm wall for movement radially inward thereby when the diaphragm is distended by internal fluid pressure, said outer plate being in torque-transmitting relationship to a corresponding one of said torque-sustaining bars, a rigid arcuate inner plate disposed radially inward from said outer plate and carrying a friction facing disposed toward said frictional-engagement face on the inner structure, and resilient rubber-like material sandwiched between said outer and inner plates and bonded to both, said rubber-like material having an appreciable radial thickness between said outer and inner plates enabling it to undergo substantial deformation circumferentially when stressed, said outer and inner plates throughout their respective extents having a substantial circumferential clearance from one another which permits substantial displacement of the inner plate circumferentially with respect to the outer plate along with circumferential deformation of said rubber-like material when said relatively rotatable structures are brought into torque-sustaining engagement.

5. A fluid-actuated coupling according to claim 4, wherein said outer plate of each wear shoe has a pair of circumferentially spaced, radially inwardly extending projections which snugly receive the respective torque-sustaining bar, and said inner plate of each wear shoe has a circumferential recess which receives said projections and which has opposite end walls substantially spaced from said projections to permit substantial displacement of the inner plate circumferentially with respect to the outer plate.

6. A wear shoe for a fluid-actuated coupling, said wear shoe comprising an arcuate rigid backing plate, an arcuate rigid second plate spaced radially from said backing plate, rubber-like material sandwiched between said plates and bonded to both, said rubber-like material having an appreciable radial thickness between said plates enabling it to undergo substantial deformation circumferentially when stressed, said plates throughout their respective extents having a substantial circumferential clearance from one another which permits substantial displacement of said second plate circumferentially with respect to said backing plate together with circumferential deformation of said rubber-like material, and a facing of friction material on said second plate at the opposite radial side thereof from said rubber-like material.

7. A wear shoe according to claim, wherein said backing plate is convex outwardly away from said second plate for engagement with a radially constricting actuating wall, and said facing of friction material is on the concave inner face of said second plate.

8. A wear shoe according to claim 7, wherein said backing plate has a pair of circumferentially spaced, radially inwardly extending projections, and said second plate has a circumferential recess which receives said projections and which has opposite end walls substantially spaced from said projections to permit substantial displacement of the inner plate circumferentially with respect to the backing plate.

References Cited by the Examiner
UNITED STATES PATENTS 2,637,427 5/53 Kraft.
2,723,015 11/55 Wellauer.
2,897,924 8/59 Fawick.
2,985,271 5/61 Wilson _____ 192—55 X
2,987,158 6/61 Kiekhaefer.
3,092,231 6/63 Kneuss.

DAVID J. WILLIAMOWSKY, *Primary Examiner.*

UNITED STATES PATENT OFFICE
CERTIFICATE OF CORRECTION

Patent No. 3,173,527                      March 16, 1965

John V. Eakin

It is hereby certified that error appears in the above numbered patent requiring correction and that the said Letters Patent should read as corrected below.

Column 5, lines 21 and 22, strike out "between said inside circumferential diaphragm wall".

Signed and sealed this 3rd day of August 1965.

(SEAL)
Attest:

ERNEST W. SWIDER                      EDWARD J. BRENNER
Attesting Officer                       Commissioner of Patents